Oct. 31, 1939.    G. BITZER    2,178,319
METHOD OF MAKING FLAT SHAPED KNITTED BLANKS
Filed April 2, 1937    9 Sheets-Sheet 2
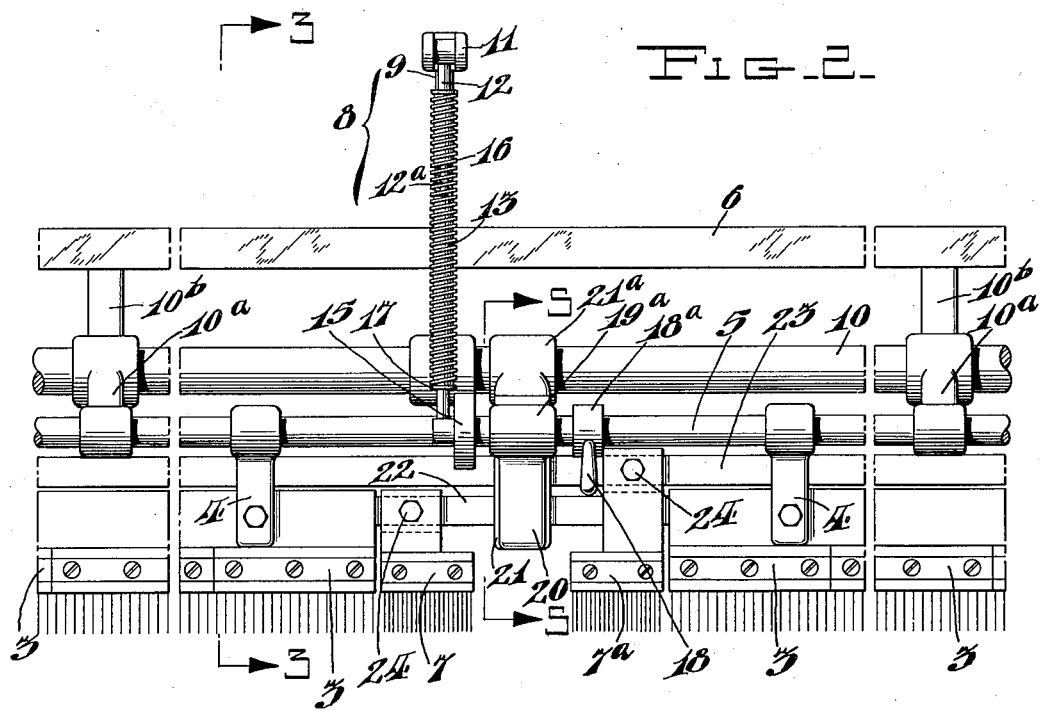
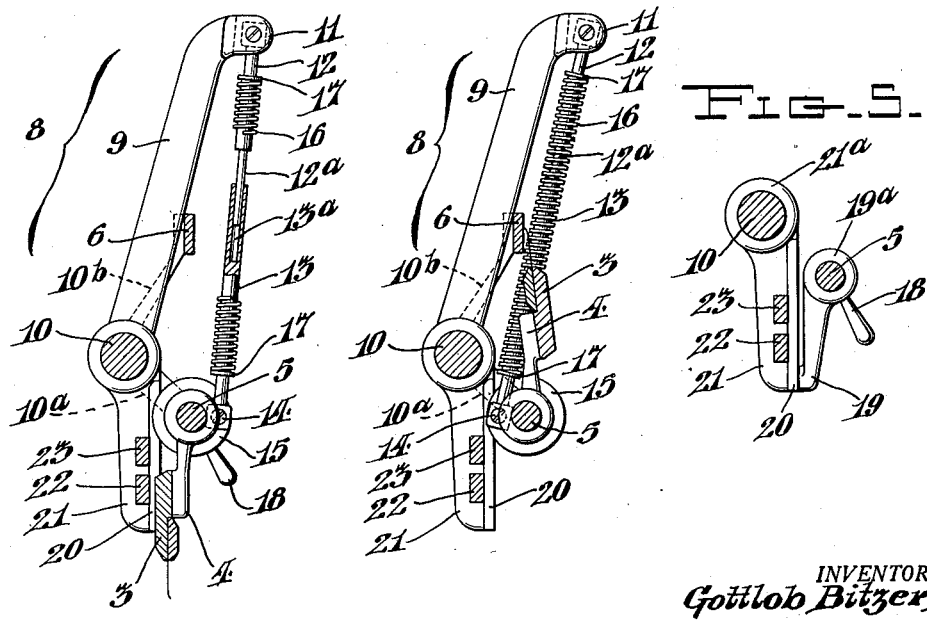
INVENTOR:
Gottlob Bitzer,
BY Alfred E. Dechinger
ATTORNEY.

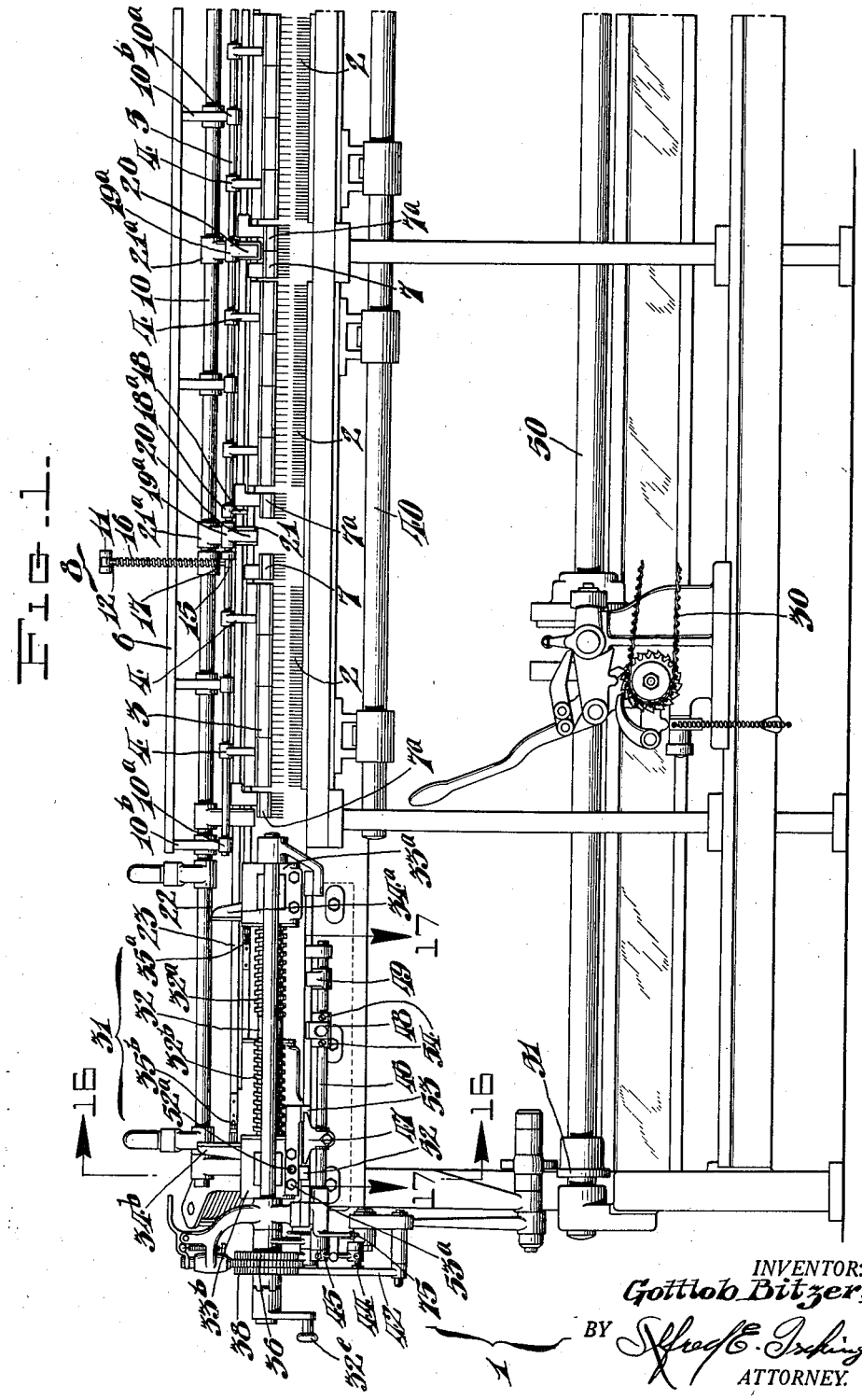

Oct. 31, 1939.   G. BITZER   2,178,319
METHOD OF MAKING FLAT SHAPED KNITTED BLANKS
Filed April 2, 1937   9 Sheets—Sheet 3
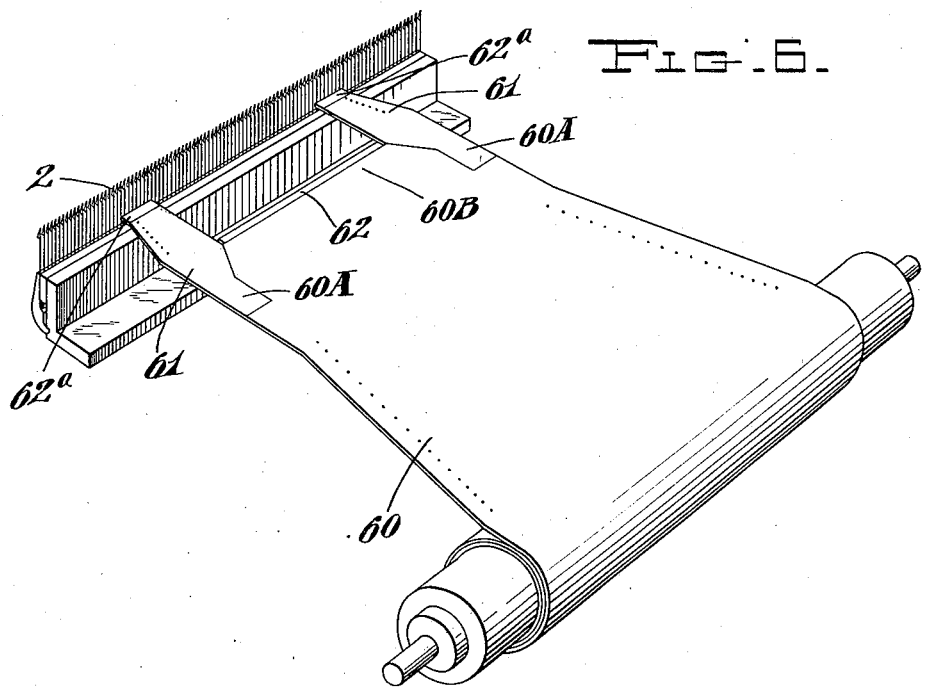
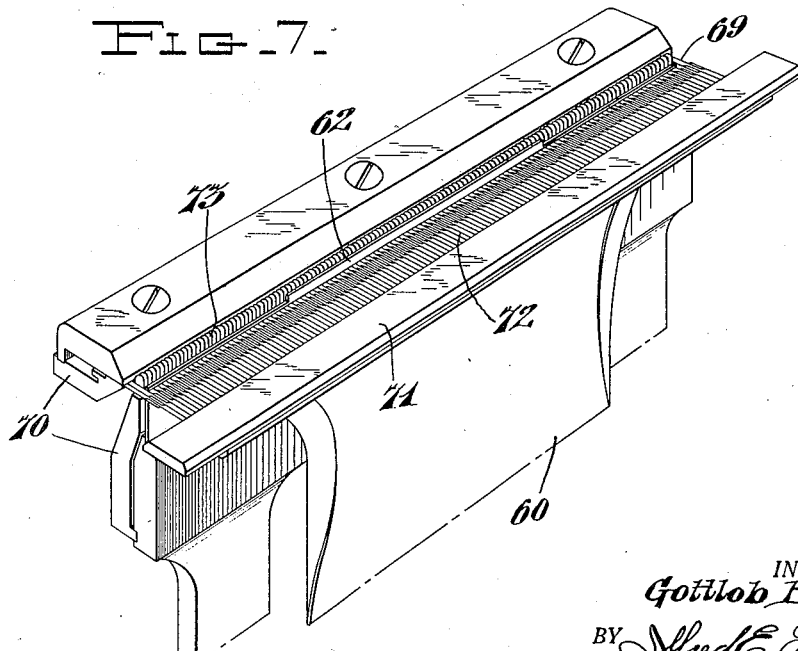
INVENTOR:
Gottlob Bitzer,
BY Alfred E. Ischinger
ATTORNEY.

Oct. 31, 1939.	G. BITZER	2,178,319
METHOD OF MAKING FLAT SHAPED KNITTED BLANKS
Filed April 2, 1937	9 Sheets-Sheet 4

INVENTOR:
Gottlob Bitzer,
BY Alfred E. Ischinger,
ATTORNEY.

Oct. 31, 1939.  G. BITZER  2,178,319
METHOD OF MAKING FLAT SHAPED KNITTED BLANKS
Filed April 2, 1937  9 Sheets-Sheet 5
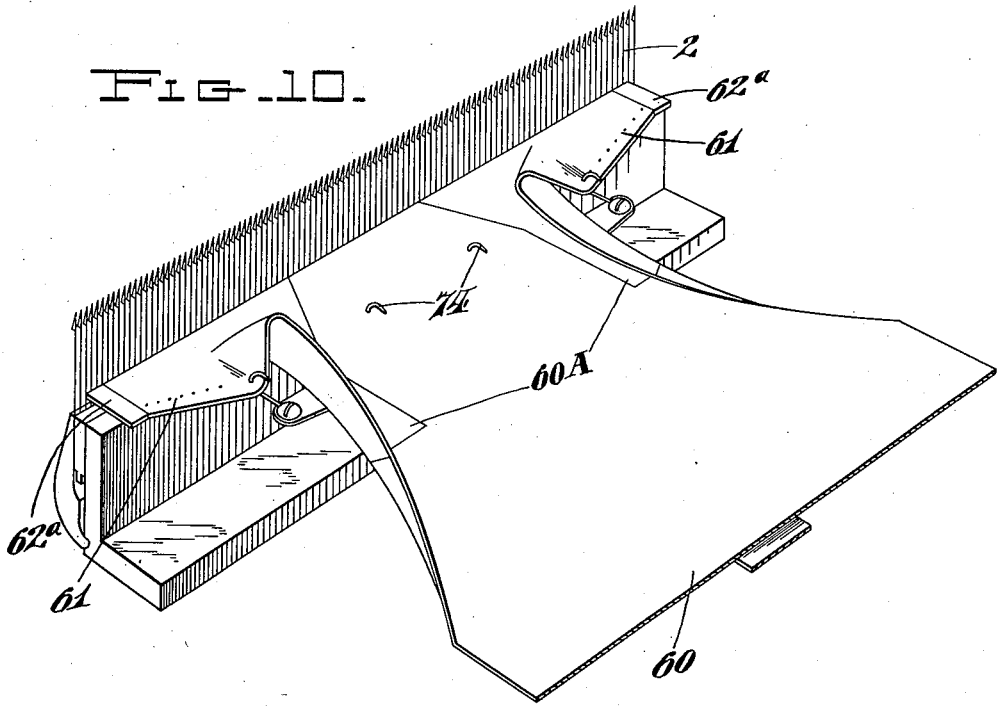
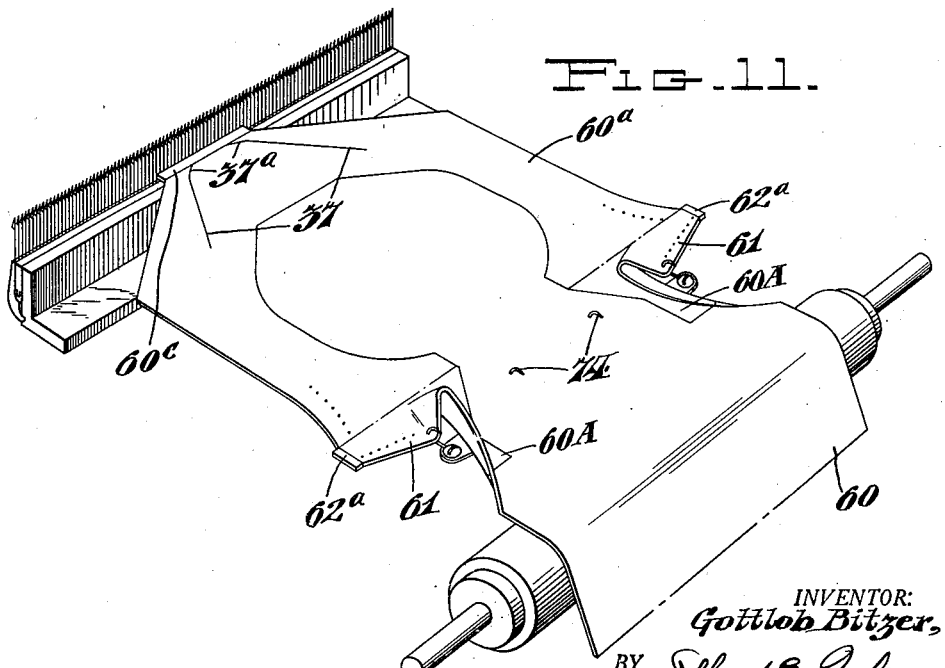
INVENTOR:
Gottlob Bitzer,
BY
ATTORNEY.

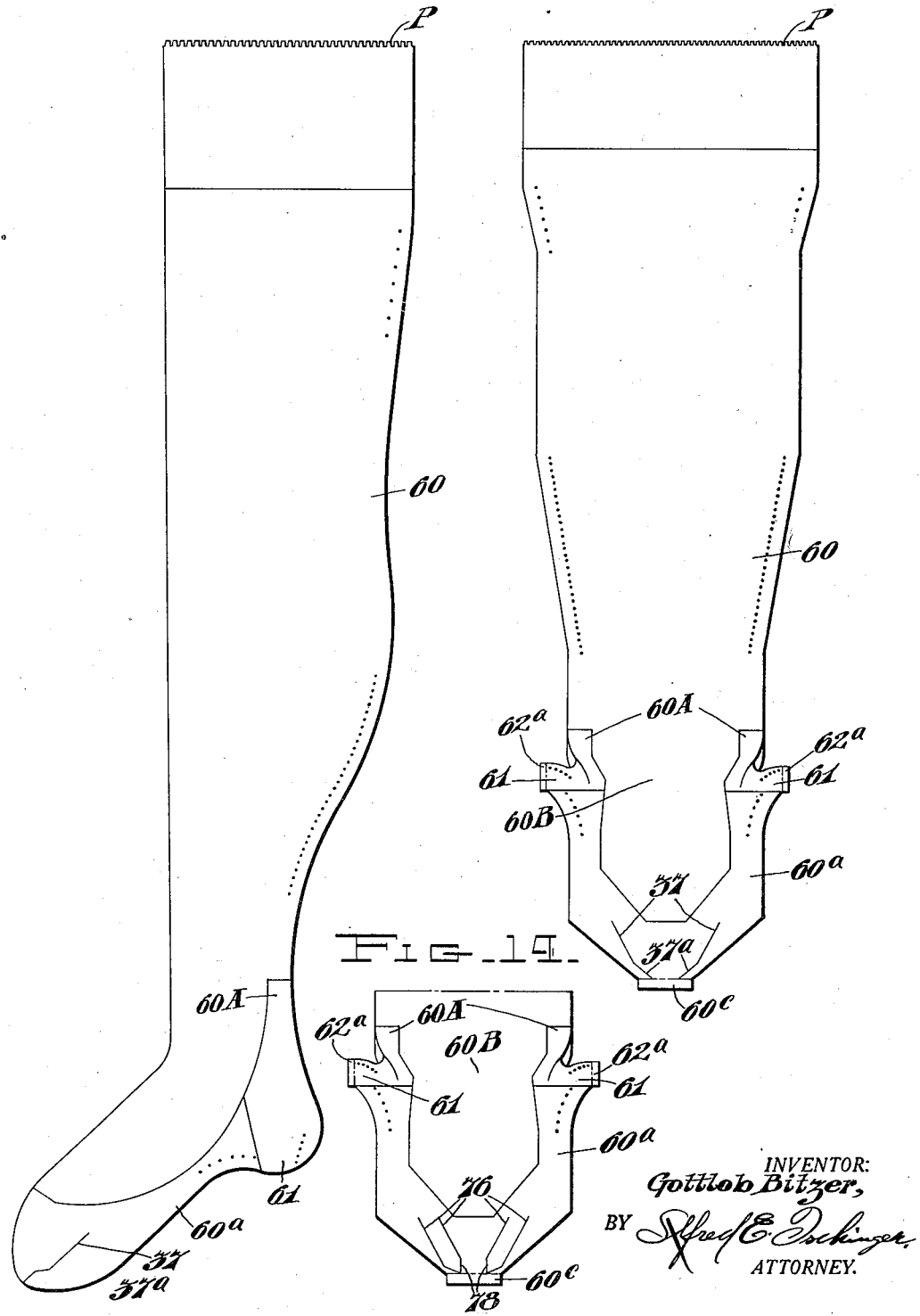

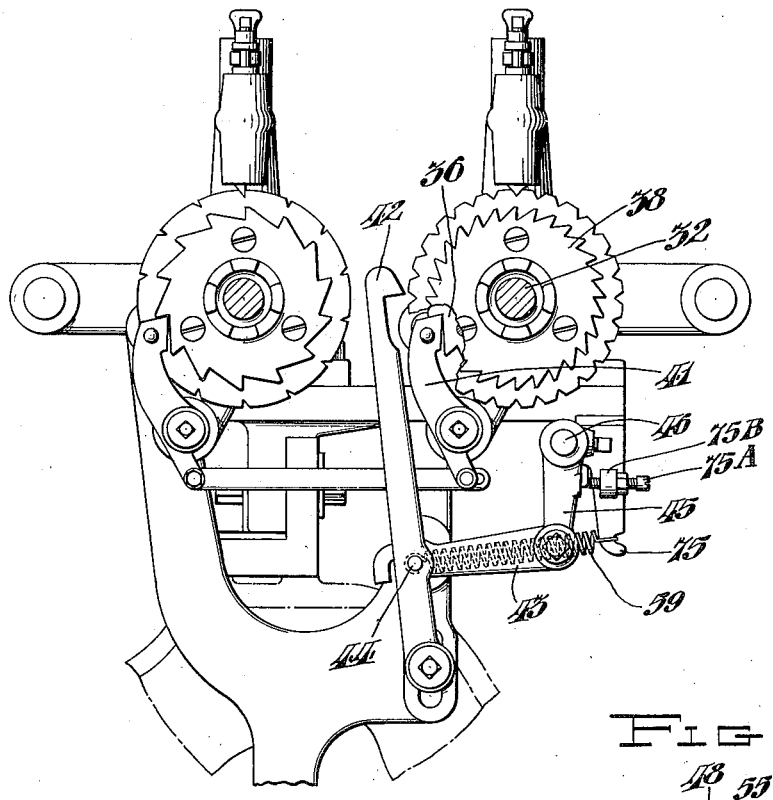

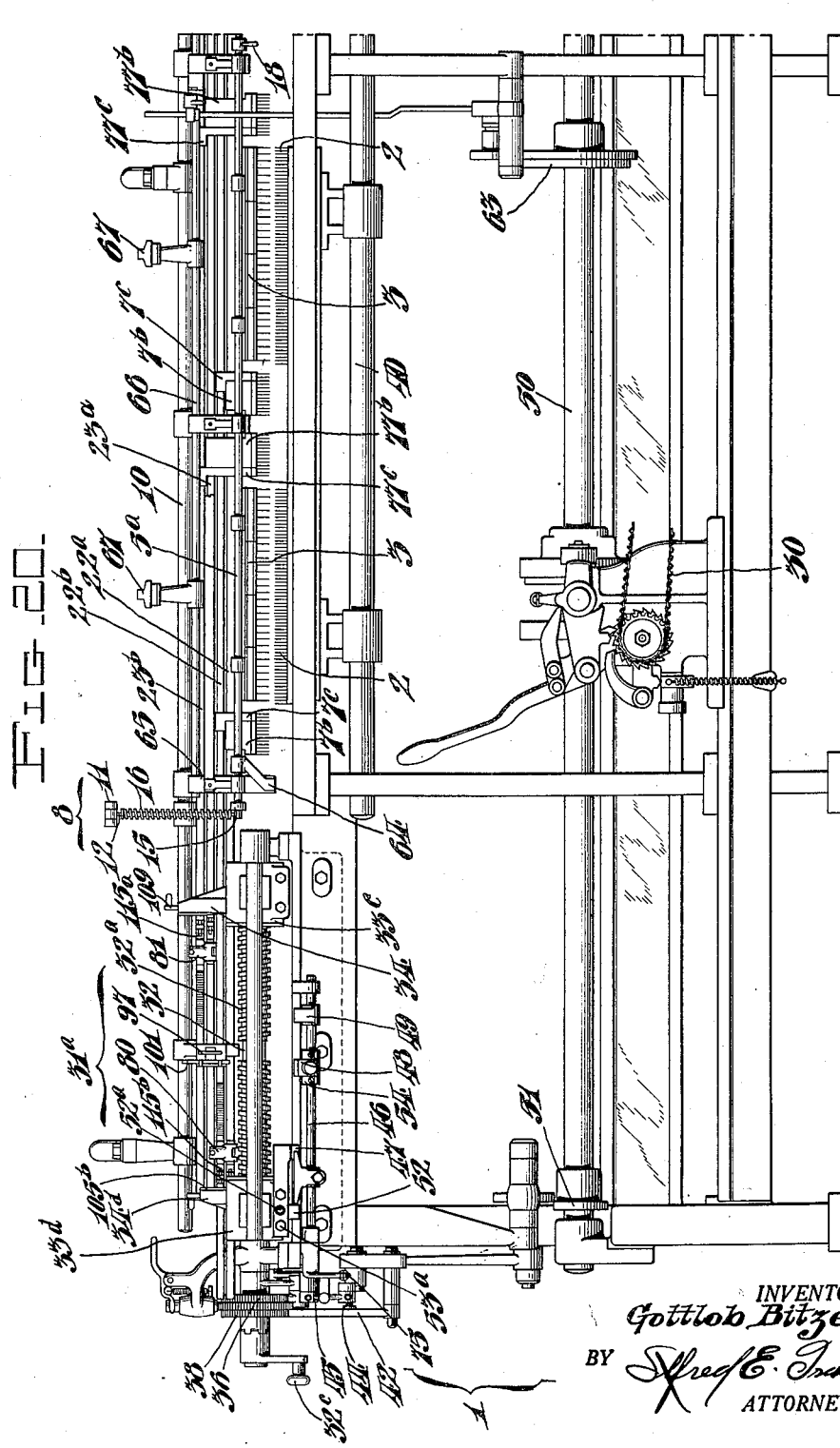

Oct. 31, 1939.    G. BITZER    2,178,319
METHOD OF MAKING FLAT SHAPED KNITTED BLANKS
Filed April 2, 1937    9 Sheets-Sheet 9
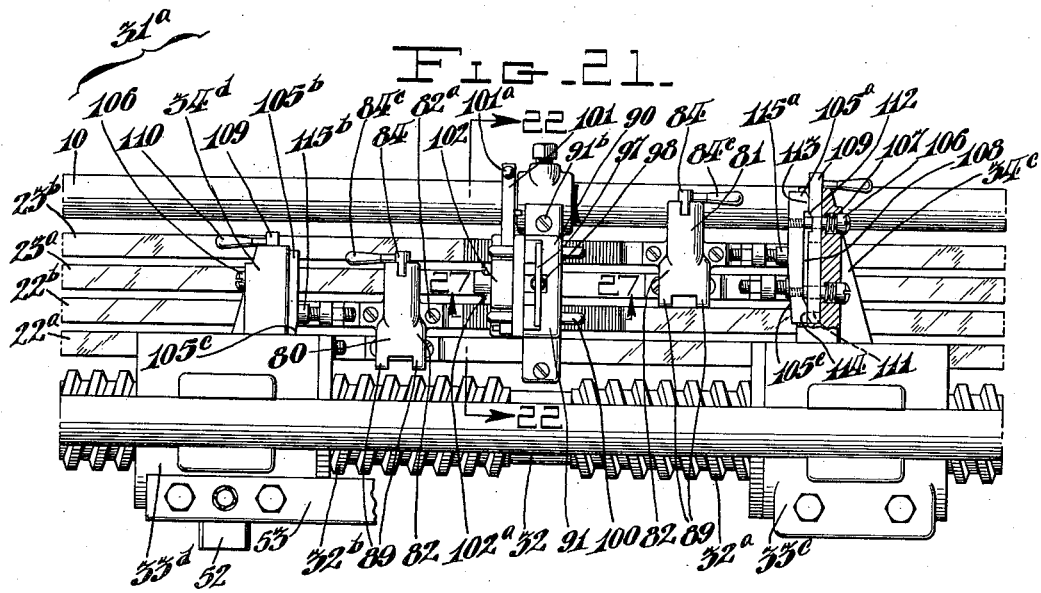
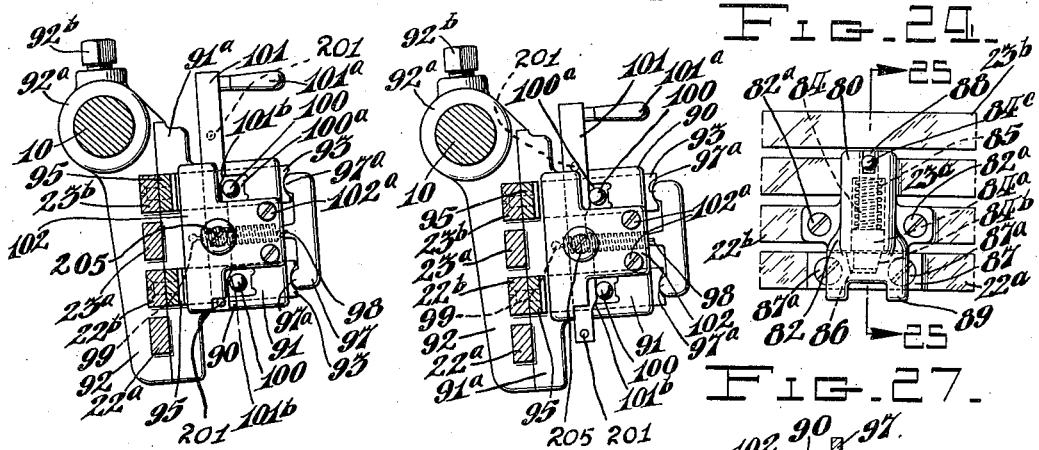
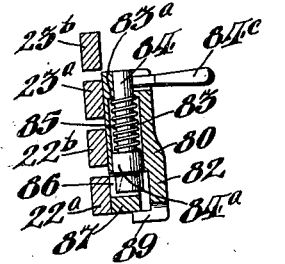
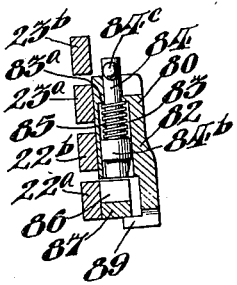
INVENTOR:
Gottlob Bitzer,
BY Alfred E. Ischinger
ATTORNEY.

Patented Oct. 31, 1939

2,178,319

UNITED STATES PATENT OFFICE 2,178,319

METHOD OF MAKING FLAT SHAPED KNITTED BLANKS

Gottlob Bitzer, Lincoln Park, Pa., assignor to Textile Machine Works, Wyomissing, Pa., a corporation of Pennsylvania Application April 2, 1937, Serial No. 134,495

12 Claims. (Cl. 66—82)

The present invention comprises a new method of making flat stocking blanks.

The principal object of the present invention is to improve the appearance of the finished stocking made either by single thread or multi-thread knitting by avoiding or minimizing the formation of a line or crease between the leg and foot portions of the blank and more especially at the central or instep portion of the blank which forms the most noticeable portion of the stocking foot.

Another object of the invention is to provide a novel method whereby both leg and foot portions of a flat blank for a full fashioned stocking may be knitted on the same needle section.

Another object of the invention is to provide a method adapted to minimize the line between the leg portion and the foot portion of a flat stocking blank having heel tabs by knitting both portions as near as may be of yarn from the same spool, bobbin or package.

In carrying out my invention, a flat blank for the leg, instep and heel portions of the stocking are knitted with the usual narrowing for fashioning purposes. Preferably, such blank is provided with a welt having the ornamental drop stitch or picot top edge. The heel portion of the blank is finished off with heel tabs in the usual manner. The machine for performing the steps above mentioned requires therefore the full complement of needles usually provided in legger machines, and preferably also a lock stitch or lace bar also common on such machines. In accordance with my invention, after the instep ravel courses and the heel tabs have been knitted, the leg portion of the blank is removed from the needle section, the heel tabs spread and the blank placed on the points of a topping machine from which it is then transferred to the points of a transfer bar, and returned to the needle section on which it was knitted, care being taken that each wale of the instep portion is returned to the needle on which it was formed. The foot section of the blank is then knitted with narrowing for fashioning purposes. For this purpose, the narrowing combs of the machine must have as many narrowing points as are ordinarily furnished on footers. Preferably, also the narrowing points at each end of each needle section are arranged in two sections as required for making the diamond point toe.

When knitting by the single thread method, the same thread is used for knitting the foot as for knitting the leg portion of the blank, because the blank is returned to the same needle section. When knitting in accordance with the multi-yarn or "ringless" system, a different thread naturally is used in the first course of the foot than that in the last course of the leg portion, since the thread is always changed in successive courses in accordance with this system. In each case, the least possible contrast is produced at the line between the leg and foot portion at the instep so far as the effect of the thread is concerned because the thread in the first course of the foot portion is always from the same spool as it would be if the blank had not been transferred. In each case, also, the effect of the needles on the junction between the two portions of the blank is substantially eliminated at the top of the foot in the finished stocking, because the loops are replaced upon the same needles on which they were originally formed and the only thing tending to form a line at this point is the effect of the points in the topping machine and in the transfer bar. Further, I find that the line between the spread heel tabs and the foot-portion of the blank is very slightly noticeable after finishing because the tabs and the foot portion have been knitted on the same needle section. My invention not only minimizes the line between the leg and foot portions of stocking blanks; but also reduces the investment needed for starting up a shop in that only one type of machine need be installed.

The novel features of the invention are pointed out in the appended claims while other objects and advantages thereof will be in part obvious and in part pointed out in the following description of two forms of apparatus illustrated in the accompanying drawings and adapted to operate in accordance with my invention.

In the drawings:

Figure 1 is an elevation on a reduced scale of one form of a combined legger and footer machine for carrying out my invention;

Fig. 2 is a fragmentary detail view of a portion of the machine shown in Fig. 1, enlarged relative thereto;

Fig. 3 is a fragmentary detail sectional view taken on the line 3—3 of Fig. 2;

Fig. 4 is a view similar to Fig. 3 but showing the parts in different relative position;

Fig. 5 is a sectional view on the line 5—5 of Fig. 2;

Fig. 6 is a fragmentary perspective view showing the finished leg portion of the stocking blank as it appears just before removing from the needles;

Fig. 7 is a view showing a portion of the topping machine having the blank of Fig. 6 transferred to the points thereof and a transfer bar arranged to receive the loops of the blank from the topping points;

Fig. 10 is a view of the blank after it has been restored to the needles on the section on which it was knitted and the draw-off hooks applied thereto for the purpose of continuing knitting;

Fig. 11 is a fragmentary view of the completed blank shown in Figs. 6–10, inclusive, after the foot portion thereof has been completed and before removal from the needles;

Fig. 12 is a plan view of the stocking blank of a full fashioned stocking produced in accordance with one form of my invention;

Fig. 13 is a side elevation of a full fashioned stocking produced from the blank of Fig. 12;

Fig. 14 is a plan view of a foot portion of another form of full fashioned stocking blank produced in accordance with another form of my invention;

Fig. 15 is a fragmentary end view of the machine shown in Fig. 1;

Fig. 16 is a fragmentary cross sectional view taken along the line 16—16 of Fig. 1;

Fig. 17 is a cross-sectional view taken substantially along the line 17—17 of Fig. 1;

Fig. 18 is a cross-sectional view taken along the line 18—18 of Fig. 17;

Fig. 19 is a view similar to Fig. 18, but showing the parts in different positions;

Fig. 20 is an elevational view of another form of a combined legger and footer machine in accordance with my invention and adapted to knit the diamond point toe;

Fig. 21 is a fragmentary elevational view of a portion of the narrowing head shown in Fig. 20;

Fig. 22 is a sectional view taken on the line 22—22 of Fig. 21;

Fig. 23 is a view similar to Fig. 22 but showing the parts in different relative positions;

Fig. 24 is a detail view of a portion of Fig. 21, the parts being shown in a different relative position;

Fig. 25 is a sectional view taken on the line 25—25 of Fig. 24;

Fig. 26 is a view similar to Fig. 25 but showing the parts in different relative positions; and Fig. 27 is a sectional view taken on the line 27—27 of Fig. 21.

Figure 8:
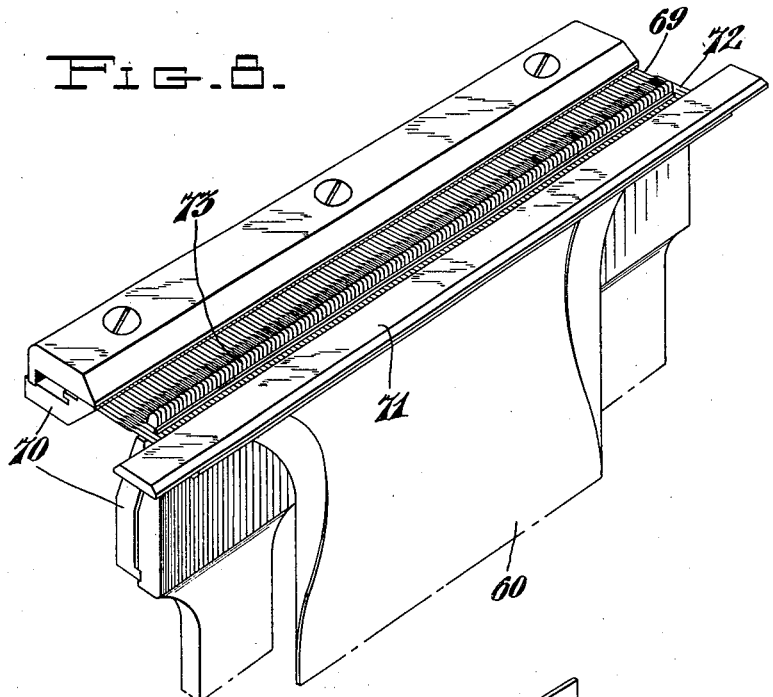
Fig. 8 is a view similar to Fig. 7 showing the loops of the blank after they have been pushed over onto the points of the transfer bar.

The drawings illustrate only those members of a "Reading" full fashioned stocking knitting machine necessary for an understanding of the invention. Other parts and mechanisms, and the operations thereof, are well known, as set forth in the "Reading" Full Fashioned Knitting Machine Catalogues, copyright 1920, 1929 and 1935, and published by the Textile Machine Works, Reading, Pennsylvania, and in a booklet entitled "Knitting Machine Lectures", published in 1935 by the Wyomissing Polytechnic Institute, Wyomissing, Pennsylvania.

Referring particularly to Figs. 1–5, inclusive, of the drawings, I have illustrated therein portions of a Reading full-fashioned legger machine modified as required by the present method and adapted to perform also the narrowing operations required for fashioning the foot of the stocking. The knitting machine shown in Fig. 1 is indicated generally at 1 and comprises, as usual, a cam shaft 50, a needle operating shaft 40, a pattern chain 30, a plurality of needle sections 2, 2, and a lock stitch or lace bar 3 with lace points therein above each needle section 2. As usual also, the lock stitch bars 3 have only one lace point for each two needles in the needle section 2. The lock stitch bars 3 are used in making the widely used picot edge P of the welt, Fig. 13, as well as for other purposes and are almost universally employed on legger machines, but are not generally employed on footer machines. The lock stitch bars 3 are fixed by arms 4, 4 to a pivoted shaft 5 whereby the bars 3 may be swung up from the working position shown in Figs. 1 and 2 to a rest position shown in Fig. 4 and in which the transfer points in bars 3 contact a rest bar 6. Both shaft 5 and rest bar 6 are supported by bracket arms 10a and 10b from the top or front narrowing shaft 10.

The needle bar sections 2 each contain enough needles for knitting the welts of the stocking blanks, the machine thus having more needles per needle section than the ordinary footer machine. It also has the lock stitch bars 3 above the needle bars 2 in accordance with the ordinary practice for legger machines. At opposite ends of each of the lock stitch bars 3 are narrowing combs 7 and 7a, containing as many points as are ordinarily supplied for the narrowing combs of footers, these narrowing combs having therefore more points than those employed in the usual legger machines. The combs 7, 7a are shown in Figs. 1 and 2 in their inactive position in which the combs for a given knitting field are positioned close alongside the lock stitch bar used with the needle section with which the given combs also cooperate, although, of course, at a different time. When the combs descend to take off loops from the needle section they then occupy temporarily positions at the ends of the needle section. The lock stitch bars being of substantially the same length as the needle sections, the combs, when in use, must pass into the space occupied by the points on the lock stitch bar when in use, so that the lock stitch bar must be thrown up into the rest position before the narrowing combs become active and a means must be employed to hold the lock stitch bar in either the active or the rest position as desired. Such means must not interfere with the narrowing combs and, owing to the use of lace bars and wide combs in machine 1, the ordinary holding means for the lace bar would interfere with the combs. I have therefore employed a holding means for the lace bar indicated generally at 8 which avoids any interference. The holding means 8 includes a long bracket arm 9 fixed to the longitudinal front narrowing shaft 10 and extending upwardly and forwardly therefrom as best shown in Figs. 3 and 4. Pivoted to upper end 11 of bracket 9 is a rod 12 the lower end of which is reduced as shown at 12a, Fig. 3, and telescoped into a bore 13a in the end of a rod 13 which is pivoted at 14 to a collar 15 on the shaft 5 of the lace bar. Surrounding the rods 12 and 13 is a throw over spring 16 which abuts at its ends against collars 17, 17, one on rod 12 and one on rod 13. When the lace bar 3 is in the active position, the pivot point 14 is in front of shaft 5 and substantially on the horizontal line through the center of shaft 5. The spring 16 therefore then holds the lace bar in the active position in which the points hang straight down as shown in Fig. 3. When the lace bar 3 is in the rest position, the pivot point 14 is at the rear of the shaft 5 and substantially on the horizontal line through the center of shaft 5. The spring 16, therefore, then holds the lace bar in the rest position as shown in Fig. 4. A handle 18 is provided which is fixed on shaft 5 by collar 18a and by the use of which shaft 5 may be thrown over to carry the lace bar 3 from active to rest position. Also on the shaft 5 is an arm 19, which is fixed on the shaft by collar 19a and which rests against a plate 20 when the lace bar 3 is in the active position to aline the points on the lace bar properly with the needles. Plate 20 is fixed to the front of a lug 21 which depends from a collar 21a on the upper shaft 10 of the narrowing mechanism and which has grooves therein covered by plate 20 and in which the narrowing rods 22 and 23 work back and forth.

The time the lock stitch bar is operated is determined by the pattern chain 30. Prior to its actual operation, however, the operator brings the bar 3 down into active position as shown in Figure 2 and the usual loose course mechanism is operated so that the loops will be large enough to accommodate readily both the lace points and the needles. Also, the operator moves the narrowing combs out of the knitting field. The pattern chain 30 and its usual associated mechanism then shifts the cam shaft 50 to bring into action the cam (not shown) for the narrowing motion. The narrowing motion cam thereupon, gives the shaft 10, along with bars 5 and 6, first a down and then an up motion, thereby stripping alternate loops from the needles to the points on bars 3. The lock stitch cam thereupon comes into play and forces a slide (not shown) between the two halves of lock stitch bar 5 to move them longitudinally in opposite directions against the pressure of coil springs (not shown) which tend to hold them in the positions shown. The slide moves bars 3 longitudinally the distance of one needle. While the halves of shaft 5 are held apart by the slide, the narrowing cam again moves the shaft 10 and bars 3 down to deposit the loops from the lace points onto the needles, thereby arranging two loops on alternate needles and leaving alternate needles bare as the points move upwardly again to a position above the needles. The slide thereupon releases the longitudinal pressure on the halves of the lock stitch bar and the springs on said halves throw the bars 3 back to their original position. After the lock stitch bar has finished its work, it is thrown up to rest position, and the combs 7, 7a are then free to be used. The times at which the combs 7, 7a are brought into play is also determined by the pattern chain 30. When it is necessary to narrow the stocking blank, the chain 30 causes cam shaft 50 to be shifted to bring into play not only the narrowing motion cam, but also cam 51 on shaft 50 whereby means is brought into operation for actuating the horizontal narrowing rods 22 and 23.

The rods 22 and 23 carry the narrowing combs 7 and 7a respectively which act on the opposite selvedges of the fabric, combs 7 and 7a being fixed to the rods 22 and 23 by set screws 24, 24. Preliminary to the narrowing operation, the combs 7, 7a are moved so that they overlap the selvedge edges of the fabric. This is accomplished by turning spindle 32 on head 31 by the handle 32c to thereby adjust the rods 22 and 23 longitudinally to the desired positions. In the narrowing operation, the lace bar 3 being in rest position, the shaft 10, descends and carries the combs 7 and 7a downward from the position of Figs. 1 and 2 so that the points on the combs engage the loops on the groups of needles extending from the selvedge edge inwardly a predetermined number of needles. The shaft 10 then moves upwardly to carry the combs to the position in which the loops are transferred thereby stripping the outer groups of loops from the needles. The combs 7 and 7a are then moved toward each other the distance of several needles by the rods 22 and 23 and moved downwardly by the shaft 10 to re-engage the narrowing points with the needles. The sinkers (not shown) having been advanced as usual to hold the loops down on the needles, the shaft 10 then raises the combs, leaving the transferred loops on the needles, to a position for the start of the next narrowing operation. The horizontal travel of the narrowing rods 22 and 23 is controlled in a known manner by the pattern chain 30 which controls in turn, and also in known manner, the mechanism of the narrowing head 31. The narrowing head 31 is a known mechanism, and is shown as having a narrowing spindle 32 provided with right and left threaded sections 32a and 32b which carry nuts 33a and 33b, the motion of which is transmitted respectively to the narrowing rods 22 and 23 by stops 34a and 34b on the nuts 33a and 33b and abutment screws 35a and 35b on the rods so that by turning the spindle 32 the combs 7 and 7a are moved in opposite directions as desired. Springs (not shown) maintain the abutment ends of screws 35a and 35b against stops 34a and 34b, respectively. The up and down motions of shaft 10 are caused by the same cam (not shown) on the cam shaft 50 as is used in causing the up and down motions of lace bar 3, both the rods and the bars being supported from shaft 10. When combs 7 and 7a have moved down and then returned to the transferring position they are then stepped toward each other a distance of two needles, due to the turning of spindle 32 by ratchet 36 on narrowing head 31 in response to the action of cam 51. The combs then are caused to descend again by the action of the narrowing motion cam and the loops thereby put back onto the needles. At the inner edges of the combs, it results that two loops are arranged on each of two needles, forming noticeable fashion marks. Rows of such marks are to be seen in both the leg and foot portions of stocking blanks and completed stockings, Figs. 12 and 13, two rows of such marks being indicated in the leg portion 60, Fig. 6, and in the foot portion 60a of the blank by lines 37, 37, Fig. 11. After the loops have been placed back onto the needles, the combs 7, 7a rise again to the level shown in Fig. 1. Such narrowing action is repeated whenever the proper buttons are brought into action by the pattern chain 30 and as many times as necessary for the desired fashioning in the section of the stocking being worked. The combs 7, 7a, usually are employed about every fifth course in a given fashioning operation.

Figure 9:
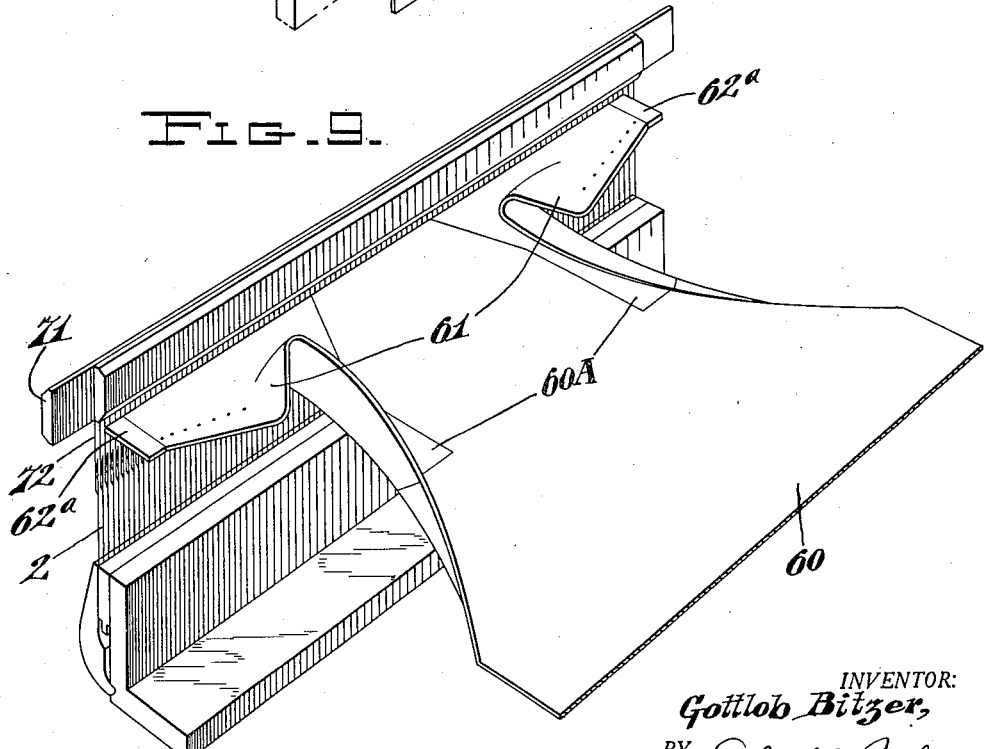
Fig. 9 is a view of a blank on the transfer bar when the latter has been arranged to transfer the loops of the blank back to the needles.

After the leg has been fashioned, and the heel portions 60A, 60A knitted, the instep portion 60B knitted and ravel courses 62 added thereto, the instep portion 60B is then removed from the needles and the heel tabs 61, 61 knitted, and the ravel courses 62a, 62a added to the heel tabs, the lower portion of the leg blank 60 for the stocking appears as shown in Fig. 6. The blank 60 is then removed from the needle section 2 on which it was knitted, the heel tabs spread and their inner edges creased in the usual manner and the lower end of the instep portion of the blank and the originally inner sides of the tabs replaced on the needles, preferably first being placed on the points 69 of a topping machine 70 by hand. The transfer points 72 of the transfer bar 71 are then aligned with the points 69 as shown in Fig. 7 and the loops stripped over the points 72 by the knockover bits 73 of machine 70. The central ravel courses 62 are ravelled out before the loops are placed on the transfer bar 71, Fig. 8, and after the loops are on the transfer bar 71 they are then transferred back to needles 2, care being taken that the end points of the transfer bar 71 are accurately alined with the end needles so that the individual loops of the instep are placed on the same needles in group 2 on which they were originally knitted, Fig. 9. This is readily accomplishd due to the fact that there are as many points 72 in bar 71 as needles 2 in each needle section and, by alining the end points carefully with the end needles, the loops are returned to the proper needles. The removal and replacement of the leg blank from and to the knitting needles may be done also by hand without resorting to a topping machine or to a transfer bar, although at the expense of greater time and care.

Hooks 74 are then placed in the blank 60 as shown in Fig. 10, and connected to the draw-off means and the knitting continued to produce the foot portion 60a of the blank as shown in Fig. 11, the narrowing combs being again utilized to fashion the foot.

In narrowing the leg and foot portions of a full fashioned stocking blank, Fig. 12, the narrowing points are generally manipulated to produce rows of narrowing marks parallel to the selvedge edge, as for instance are found in the knee, lower leg areas of the leg 60, the sole, and the lower portion of the toe area of the foot blank. These parallel rows of narrowing marks are produced, in this instance, by moving the narrowing points inwardly a distance of two needles and from that position starting the next succeeding narrowing movement. In the heel tab areas of the leg and the upper portion of the diamond point toe areas of the foot blank, the points are manipulated to produce the narrowing marks on a line inclined toward the selvedge edge. The narrowing marks in the teel tabs 61 and upper toe areas 37 are produced in this instance by moving the narrowing combs 7 and 7a inwardly a distance of two needles, in the usual manner, and retracting the points a distance of one needle before the loops are picked up by the narrowing points in the next succeeding narrowing movement.

To move the narrowing combs 7 and 7a to produce the narrowing marks parallel to the selvedge edge, the ratchet wheel 36, Fig. 15, secured to the narrowing spindle 32 is moved in a clockwise direction by a forward racking pawl 41 in response to the operation of the narrowing head actuating cam 51 on the cam shaft 50.

To produce the narrowing marks which are on a line inclined toward the selvedge edge, a second ratchet wheel 38 is also fixed to the spindle 32. Wheel 38 has twice as many teeth as wheel 36 and the teeth of wheel 38 point in the opposite direction around spindle 32 from those of wheel 36. Wheel 38 is acted upon by a second pawl 42 which is normally held in inoperative position by a link 43, one end of which is connected to the pawl 42 by a pin 44 and the other end of which is connected to one end of a lever 45. The lever 45 is secured to a shaft 46 which is rocked to control the operative or inoperative positions of the pawl 42 relative to the ratchet wheel 38.

Rocking movement of the shaft 46, Fig. 17, is controlled by a series of cams 47, 48 and 49 carried thereby which coact with abutment members 52 and 53 which are secured to nut 33b by means of a screw 52a, and of screws 53a respectively, Figs. 1 and 16. When either of cams 47, 48 or 49 is in active engagement with member 52 or member 53, pawl 42 is held in inoperative position. Cams 47 and 49 are fixed to the shaft 46, whereas the cam 48 is rotatably mounted on the shaft 46 between collars 54 and may be moved into or out of alinement with the abutment member 53 as desired. The cam 48 is provided with a detent 55 having an end 55a which cooperates with a hole 56 in the shaft 46 when in an inoperative position shown in Fig. 18, and with a hole 57 in the shaft when in an operative position shown in Fig. 19. The detent 55 is biased toward the shaft 46 by a coil spring 58 (Fig. 18). The cams 47, 48 and 49 are biased toward the abutment members 52 and 53 by a spring 59, one end of which is anchored to a bracket 75 fixed to the machine frame and the other end of which is anchored by the pin 44 fixed to the pawl 42, spring 59 serving therefore also to throw pawl 42 into operative position when permitted by the cams 47, 48 and 49. A set screw 75A is mounted in a boss 75B on bracket 75 and arranged so it can be set to hold pawl 42 from approaching more than a certain distance from ratchet 38. Pawl 42 is thereby prevented from utilizing its full stroke in turning ratchet 38, missing the first tooth on its down stroke and racking 38 only one tooth per stroke.

During production of the knee and calf narrowings in the leg portion of the stocking blank the cam 47 is in engagement with the abutment members 52 and 53 during which the shaft 46 is so positioned as to hold the pawl 42 out of engagement with the ratchet 38. Also at this time the cam 48 is in the inoperative position of Fig. 18. As the last narrowing movement in the lower leg area of the stocking is completed, the abutment member 52, which has been moved axially of the shaft 46 to the right, as viewed in Fig. 1, moves out of engagement with the cam 47 and shaft 46 is rocked in a counterclockwise direction by the spring 59, thereby moving the pawl 42 into engagement with the ratchet 38. While the heel tabs are being narrowed, the spindle 32 is intermittently actuated by the pawls 41 and 42 in the manner necesary to first move the point combs 7 and 7a through a usual narrowing movement and then to retract the point combs a one-needle distance in successive order.

After the heel tabs are completed, to prepare the machine to produce the sole narrowings in the foot portion of the stocking blank, the pawl 42 is again moved to an inoperative position by moving the cam 48 from its position in Fig. 18 to the position of Fig. 19, in which it engages the abutment member 53. As the last sole narrowing is completed the abutment member 53 will ride off the edge of the cam 48, whereupon the spring 59 draws the pawl 42 into engagement with the ratchet 38. The pawl 42 will remain in engagement with the ratchet 38 all through the production of the narrowings in the upper part of the toe area. As the last of these narrowings is completed the abutment member 53 will engage the cam 49, moving the pawl 42 to an inoperative position, at which time the narrowings in the lower part of the toe area are completed.

The form of apparatus illustrated in Figs. 20 to 27 inclusive differs from that illustrated in Figs. 1 to 13 and 15 to 19 inclusive in that it is equipped to make the customary "diamond point" toe. The lock stitch bar 3 and its action, the throw over spring 16 and its action, the action of the narrowing motion cam, the pattern chain and its action, and the cam shaft 50 and cam 51 are all substantially the same in the two forms of machines. An additional cam 63 is necessary on the cam shaft 50 for operating a covering knife mechanism which is used in the final operation of forming the diamond point in the toe of the stocking.

The lock stitch shaft 5a of Fig. 20 has a throw over and holding spring 16 which is, however, placed at the end of the shaft instead of intermediate its ends. The shaft 5a also has fixed thereon an arm 64 which is inclined somewhat axially of shaft 5a so that its free end lies in the same plane transverse to shaft 5a as a plate 65 which is fixed to the frame of the machine and has a vertical face arranged to be contacted by the arm 64 at both the active and inactive positions of the lock stitch bar 3 to hold the lock stitch bar in the desired positions.

The narrowing combs of the machine shown in Fig. 20 are in separable sections, 7b and 7c respectively, at the left end of the lock stitch bar 3 and sections 77b and 77c respectively at the right hand end of bar 3. Sections 7b and 77b are longer than sections 7c and 77c. Each section further is fixed to its own narrowing rod so that there are four narrowing rods. As shown, comb 7b in each knitting section is fixed to bar 22a, comb 7c is fixed to a bar 22b, comb 77b is fixed to bar 23a, and bar 77c is fixed to bar 23b. However, when fashioning the leg portion of the blank, the combs 7b and 7c are used as a unit and the combs 77b and 77c are used as a unit. Narrowing head 31a therefore is provided with means best shown in Figs. 21, 22, 23, and 24 whereby the four bars may be tied together in pairs to hold the combs 7b in contact with combs 7c and combs 77b in contact with combs 77c as shown in Fig. 20 to move simultaneously in the relative position shown. For this purpose, two similar latches 80 and 81 are provided, one of which is illustrated in detail in Figs. 24, 25 and 26. Latch 80 comprises a case 82 fastened by screws 82a, 82a to the front face of bar 22b of the pair. Case 82 has a central vertical bore 83 therethrough in which is a bolt 84. The major portion of bore 83 is relatively larger than its upper end so that a shoulder 83a is formed and bolt 84 has a collar 84a thereon between which and shoulder 83a is a coil spring 85 thrusting against the bolt in a downward direction. The lower end of bolt 84 is arranged, when the bolt is free to move under the influence of spring 85, to move down into a socket 86 in a U-shaped member 87 fixed to the narrowing bar 22a by screws 87a, 87a. The sides of socket 86 are flared outwardly and upwardly in the direction of the length of bar 22a to facilitate the entrance of the lower end of bolt 84 into socket 86 and the lower end of the bolt is bevelled at 84b complementally to the inclination of socket 86, and the two surfaces wedge together as shown in Fig. 24 so that the bars 22a and 22b are held with combs 7b and 7c pressed close together and in position to act as a unit whenever the bolt 84 is in its lower position. When the bolt 84 is down, the handle 84c at the upper end of bolt 84 extends forwardly at right angles to the plane of the narrowing bars 22a, 22b, 23a and 23b and lies in a notch 88 in the upper edge of case 80 so that the handle and bolt are held against turning. In such position of the parts, combs 7b and 7c on the one end and combs 77b and 77c on the other end of each needle section, act as units, producing the same single line fashion marks as produced by the allochiral combs 7 and 7a of Fig. 1. The diamond point toe, however, has two rows of fashion marks on each side of the foot portion of the stocking blank and, in producing such effect, it is necessary to release bar 22a from bar 22b and bar 23a from bar 23b. When it is desired to release bar 22a from 22b, handle 84c is raised to lift it out of notch 88 and turned parallel to bar 22a as in Fig. 21. The lower end of bolt 84 is thereby raised from socket 86 and bar 22a is free to move relatively to bar 22b. The narrowing bars 23a and 23b are also disconnected by the operator in the same way at the same time, by lifting and turning the handle of latch 81. The case 82 has fingers 89, 89' thereon which extend inwardly from the lower end of the case beneath member 87 to assist in maintaining bars 22a and 22b in proper relative position by resisting the thrust of spring 85.

It is necessary, however, when bars 22a and 23a are disconnected from bars 22b and 23b respectively that means be provided to prevent the movement of one bar from moving the other. For this purpose, a detent structure 90 is provided to prevent bars 22b and 23b from moving accidentally. Detent 90 is illustrated in detail in Figs. 22, 23 and 27 and comprises a block 91 having a base portion 91a fixed by screws 91b to an arm 92 depending from a collar 92a which surrounds narrowing shaft 10 and is fixed thereto by set screw 92b. Within block 91 and mounted to move therein at right angles to bars 22b and 23b are two plungers 93, 93, the sharpened inner ends 93a of which are arranged to engage in V-shaped notches 94 in auxiliary bars 95, 95 fixed to narrowing bars 22b and 23b by screws 96, 96 or other suitable means. The bottoms of notches 94 are spaced just one needle distance apart. A bridge piece 97 has rounded laterally projecting knobs 97a, 97a which seat in complemental recesses in the outer ends of plungers 93. Bridge 97 is connected at its center to a tension spring 98, the other end of which is fixed to block 91 at 99 so that the spring 98 continuously urges the plungers 93 toward the bars 95. Therefore, when plungers 93 are not restrained, they hold bars 22b and 23b against accidental movement, but yield to permit the bars to move under the positive action of the threads on spindle 32. In order to disable the plungers 93 when bars 22a and 22b and also bars 23a and 23b are locked together, plungers 93 have short handle rods 100, 100 passed therethrough parallel to bars 22b and 23b and having a tight fit with plungers 93 whereby the plungers may be withdrawn from contact with notches 94. Block 91 has apertures 100a therein through which rods 100 pass and which are large enough to permit the necessary movements of the rods 100 on plungers 93. In the arrangement shown, the plungers 93 are both drawn away from notches 94 and held away therefrom when desired by cam bar 101 having a handle 101a at its upper end and lying transversely to the narrowing bars. Cam bar 101 has two cam surfaces 101b, 101b so placed that when the bar 101 is pushed down into the position shown in Fig. 23, the plungers 93 are forced outwardly away from notches 94 by the action of cams 101b on rods 100. When bar 101 is drawn up by handle 101a, rods 100 are free to move into recesses in the edge of bar 101 just below the cam surfaces 101b and the spring 98 therefore throws the plungers 93 into notches 94 on the bars 95. Bar 101 is held in place against one face of block or case 91 by a heavy T-shaped plate 102 which is recessed to receive bar 101 as best shown in Fig. 27 and which is held against block 90 by screws 102a. Movements of bar 101 in the up and down direction are limited by pins 201, 201 arranged to strike one on block 91 and the other on plate 102. Further, a screw 205 is carried in plate 102 and arranged transversely to bar 101. Screw 205 carries a spring (not shown) which presses against a ball detent (not shown) arranged to press against and engage depressions in bar 101 to prevent accidental movement thereof.

After the narrowing bars of the two pairs have been unlatched by raising members 84 in locks 80 and 81 and bars 22b and 23b frictionally engaged with shaft 10 by contacting plungers 93 with the notched bars 95, means are required to move rods 22b and 23b relatively to the others. For this purpose, standards or stops 34c and 34d on the narrowing nuts 33c and 33d carry bar-like stepping cams 105a and 105b which lie partly in grooves 108 in the stops and are carried at the ends of screws 106, 106 which extend through the stops 34c and 34d. The holes for screws 106 are countersunk to receive springs 107 which thrust at one end against shoulders at the bottoms of the countersunk portions of the screw holes and, at their other ends, against the heads of the screws 106, and which pull bars 105a and 105b toward the bottoms of grooves 108. Between stepping cams 105a and 105b and the bottoms of grooves 108 are positioning cams 109 which have handles 110 at their upper ends lying above the upper ends of stops 34c and 34d and by which the cams 109 may be thrust up and down to the extent permitted by the length of the slots 111 in cams 109 through which screws 106 extend. Cams 109 are straight along those of their edges in contact with the bottoms of grooves 108 and are also straight on their opposite edges except for recesses 112. On their edges facing bars 109, the stepping cam bars 105a and 105b have projections 113 and 114 at their upper and lower ends respectively, which are so arranged that, when handle 110 is pulled up, projection 113 slips into recess 112 and projection 114 overlies the lower end of bar 109. When, however, as shown in Fig. 21, bar 109 is pushed down so that its lower end is against the lower end of slot 108, the stepping cam is pushed to the left or right by inclined surfaces on bars 109 lying at their extreme lower ends and at the upper ends of recesses 112 and complemental to surfaces on the stepping cam bars 105a and 105b lying on the upper sides of projections 113 and 114 so that projections 113 and 114 lie against the straight edges of bars 109 thereby setting out the cams 105a and 105b to contact adjustable abutment screws 115a and 115b on the narrowing rods 23b and 22b, respectively, moving narrowing rods 22b and 23b a distance equal to one needle, relative to the narrowing rods 22a and 23a, respectively. The narrowing operations in the upper part of the diamond point toe area may then be proceeded with in a manner heretofore set forth, in which the narrowing nuts 34c and 34d are moved inwardly a distance of two needles and retracted a distance of one needle before the narrowing nuts are moved in the next succeeding narrowing movement.

Forward and backward movements of the narrowing nuts 34c and 34d are controlled by the forward racking pawl 41 and the backward racking pawl 42. Positioning of the pawl 42 relative to its associated ratchet 38 is effected as heretofore set forth, by the shaft 46, which is actuated by cooperation of the abutment members 52 and 53 with cams 47, 48 and 49.

The adjustable abutment screws 115a and 115b on narrowing bars 23b and 22b respectively, are spaced, as shown in Fig. 21 away from and at no time contact the stops 34c and 34d even when the edges of combs 7b and 7c are in contact, and the edges of combs 77b and 77c are in contact. Therefore, after the pairs of combs have been set to overlap the selvedge edges, handles 84c and 101a being in the up positions and handle 110 being in the down position, when the narrowing nuts 34c and 34d are retracted, the cams 105a and 105b are also retracted so that in the final upward movement of the narrowing rods in each narrowing operation, the heads of screws 115a and 115b will be aligned with the upper parts of cams 105a and 105b, respectively, and therefore will not effect a movement of the narrowing rods 23b and 22b relative to the rods 22a and 23a.

With the combs 7c and 77c spaced a one needle distance from the combs 7b and 77b respectively, a loop is left on the needle intermediate those lifted by the combs 7c and 77c when the following downward and upward motions of the shaft 10 carry the combs down and up. Consequently, when the spindle 32 is turned by the action of pawl 41 on ratchet 36 fixed to the spindle, to move the narrowing bars 22a and 23a inwardly two-needle distances with respect to the needle sections and then again down and up, the needle on which the loop was left between the separable comb sections has another loop deposited thereon, forming a fashion mark. The same thing occurs, of course, at the inner ends of the shorter comb sections 7c and 77c. The movement of bars 22a and 23a through two-needle distances, of course, moves the bars 22b and 23b only one-needle distance because of the initial space between them. The combs having been returned to their original level, the spindle 32 then is turned backward, by the action of pawl 42 on the ratchet 38 also fixed to the spindle, to move the longer comb sections 7b and 77b back one-needle distance so that a distance of one-needle space remains between the adjacent needles of the combs of each pair. The same motions of the combs being repeated, a double row of fashion marks 76 is made by each pair of combs, spaced apart a number of loops equal to the points on the shorter combs. The rows of fashion marks made by each pair of combs are parallel, but step inwardly from the original line of the selvedge edge only one-needle distance at each narrowing operation, while the selvedge edge itself moves inwardly two-needle distances at each narrowing operation. The rows of fashion marks and selvedge edges are therefore not parallel but approach each other.

The knitting having proceeded to a point near the toe end of the blank and it being then desirable to bring together into points the double rows of fashion marks, one on each side of the blank portion 60a, the operation of the spindle 32 is changed automatically when the abutment member 53 engages the cam 49 to effect disengagement of the pawl 42 with the ratchet 38, whereby, the wide narrowing combs 7b and 77b are no longer retracted after the inward narrowing step. The narrowing combs 7c and 77c remain, however, separated from the combs 7b and 77b by a one needle distance, at the time of the initial dipping movement of the combs in each narrowing operation, by the action of the bar shaped stepping cams 105a and 105b. After the combs perform the transferring portion of the narrowing operation, the narrowing nuts 34c and 34d remain at the transferred position, so that in rising to the position occupied by the combs for the next succeeding narrowing operation, the screws 115a and 115b on the rods 23b and 22b, ride up an inclined surface 105c of the cams 105a and 105b, respectively, thereby moving the combs 7c and 77c a distance of one needle away from the combs 7b and 77b. The formation of a double row of fashion marks on each side of the blank is, therefore, continued, but the inclination of the outer row of fashion marks to the center line of the blank is changed sharply so that it is parallel to the selvedge edge.

The same shift of cam shaft 50 causing the change in action of the spindle 32 also throws into action the cam 63 controlling operation of the shaft 66 for the covering knives or plates 67, one of which lies centrally of each knitting or needle section 2. Lowering of the covering knives 67 into active position is effected in the usual manner, after which the covering knives are moved into a position between the points and needles prior to the initial dipping movement of the narrowing combs in each narrowing operation to prevent the removal of loops from the needles in the covering knife zone. The coverknives, however, after the initial dipping action, move out of engagement with the needles and points, so as not to interfere with the loop transferring portion of the narrowing operation. Therefore, in preventing the engagement of certain points by means of the covering knives the inner line of narrowing marks will form vertical lines and with the wide combs 7b and 77b moving inwardly a distance of two needles the two lines of narrowing marks produced by the combs 7b, 7c and 77b, 77c will approach each other to form sharp angles or diamond points 78, one on each side of the foot portion of the blank. After the narrowing operations are completed in the diamond point toe area, a ravel course 60c is produced to complete the foot portion of the stocking blank, Fig. 14.

Although several forms of apparatus for carrying out my invention have been shown and described, changes may obviously be effected therein without departing from the spirit and scope of the invention, as set forth in the appended claims.

What I claim is:

1. The method of making a flat blank for a full-fashioned stocking comprising knitting on a needle bar section a leg portion, an instep portion and heel portions for said blank with narrowings arranged to produce fashioning of the stocking, knitting ravel courses on said instep portion, removing said instep portion from the needles of said section and entirely from all connection with said bar section except through said heel portions, knitting tabs on said heel portions, removing said tabs from the needles, spreading said tabs by hand, placing the loops along the lower edge of said instep portion and those along the inner edges of the tabs back on the needles so that the loops of said instep portion are replaced each on the same needle on which it was formed, and knitting a foot portion for the blank.

2. The method of making a flat blank for a full-fashioned stocking comprising knitting on a needle bar section, a leg portion, an instep portion and heel portions for said blank with narrowings arranged to produce fashioning of the stocking, knitting ravel courses on said instep portion, removing said instep portion from the needles and entirely from all connection with said bar section except through said heel portions, knitting heel tabs on said heel portions, removing said tabs from said section, spreading said tabs by hand, placing the loops along the lower edge of said instep portion and those along the inner edges of the tabs on points in a bar, transferring the loops on said points back to said needles so that each of the loops of said instep portion is replaced on the needle on which it was formed and knitting a foot portion for said blank on said section.

3. In the method of making full fashioned stockings, the steps comprising knitting a flat blank for a stocking having a leg portion, and instep portion and heel portions thereon on a certain group of needles of a flat knitting machine, knitting ravel courses on said instep portion, removing the instep portion of the blank from the needles, knitting heel tabs for said heel portions on sections of said group and entirely from all connection with said bar section except through said heel portions, removing said tabs from the needles, spreading said tabs apart by hand, and placing the edges thereof which were the inner parallel ones in alinement with the lower edge of said instep portion on the points of a transfer bar, transferring said edges back to said group of needles and knitting a foot portion onto said blank.

4. The method of making a flat blank for a full fashioned stocking comprising knitting on a needle bar section a leg portion, an instep portion and heel portions for said blank with narrowings arranged to produce fashioning of the stocking, knitting ravel courses on said instep portion, removing the instep portion of the blank from the needles, knitting heel tabs on said heel portions, removing said tabs from said section and entirely from all connection with said bar section except through said heel portions, spreading said tabs by hand, placing the loops along the lower edge of said instep portion and those along the inner edges of the tabs on the points of a point bar, transferring said loops back to the needles of said section, and knitting a foot portion for said blank on said section while operating in a way to produce a diamond point toe.

5. The method of making a flat blank for a full fashioned stocking comprising knitting on a needle bar section a leg portion, an instep portion, and heel portions with narrowings arranged to produce fashioning of the stocking, knitting ravel courses on said instep portion, removing said instep portion from the needles, knitting tabs on said heel portions, removing said tabs from the needles of said section and entirely from all connection with said bar section except through said heel portions, spreading said tabs by hand, placing the loops along the lower end of said instep portion and those along the inner edges of the tabs on the points of a point bar, transferring said loops back to the needles of said section, connecting draw-off hooks to said tabs and to the lower part of said instep portion, and continuing knitting to form a foot portion on the blank.

6. The method of making a flat blank for a stocking comprising knitting on a needle bar section a leg portion, an instep portion, knitting ravel courses on said instep portion, and heel portions, removing said instep portion from said section and entirely from all connection with said bar section except through said heel portions, knitting tabs on said heel portions, spreading said tabs by hand, placing the loops along the lower end of of said instep portion and those along the inner edges of the tabs on the points of a topping bar, shifting said loops from said points to the points of a transfer bar, transferring said loops back to the needles of said section so that the loops at the lower end of the instep portion are replaced on the same needles on which they were formed, and knitting a foot portion for said blank on said section.

7. The method of making a flat blank for a full fashioned stocking comprising knitting on a needle bar section a leg portion, an instep portion and heel portions with narrowings arranged to produce fashioning of the leg of the stocking, knitting ravel courses on said instep portion, removing said instep portion from said section and entirely from all connection with said bar section except through said heel portions, knitting tabs on said heel portions, removing said tabs from said section and spreading them by hand, placing the loops along the lower end of said instep portion and those along the inner edges of the tabs on the points of a topping bar, shifting said loops on said points to the points of a transfer bar, transferring said loops back to the needles of said section so that loops at the lower edge of said instep portion are replaced on the same needles on which they were formed, and knitting a foot portion for said blank on said section while narrowing to fashion the foot portion.

8. The method of making a flat blank for a stocking comprising knitting on a needle bar section a leg portion, an instep portion and heel portions, knitting ravel courses on said instep portion, removing said instep portion from the needles and entirely from all connection with said bar section except through said heel portions, knitting heel tabs on said heel portions, removing said tabs from said section and spreading said tabs by hand, placing the loops along the lower end of said instep portion and those along the inner edges of said tabs on the points of a topping bar, shifting said loops from said points to the points of a transfer bar, transferring said loops back to the needles of said section so that the loops along the lower end of said instep portion are replaced on the same needles on which they were formed, connecting draw-off hooks to said tabs and to the lower part of said leg portion, and continuing knitting to form a foot portion for said blank.

9. The method of making a flat blank for a stocking comprising knitting on a needle bar section a leg portion, an instep portion and heel portions for said blank, knitting ravel courses on said instep portion, removing said instep portion from said section, knitting heel tabs on said heel portions, removing said tabs from said section and entirely from all connection with said bar section except through said heel portions, spreading said tabs by hand, placing the loops along the lower end of said instep portion and those along the inner edges of the tabs on the points of a topping bar, shifting said loops to the points of a transfer bar, transferring said loops back to the needles of said section so that the loops along the lower end of said instep portion are replaced on the same needles on which they were formed, and knitting a foot portion for said blank on said section while narrowing with narrowing combs and covering the needles under certain points of the narrowing combs with covering knives in a way to produce a diamond point toe.

10. The method of making a flat blank for a stocking comprising knitting on the needle bar section a leg portion, an instep portion and heel portions, knitting ravel courses on said instep portion, removing said instep portion from said section and entirely from all connection with said bar section except through said heel portions, knitting heel tabs on said heel portions, removing said tabs from said section and spreading said tabs by hand, placing the loops along the lower end of said instep portion and those along the inner edges of the tabs on the points of a point bar, transferring said loops back to the needles of said section so that the loops along the lower end of said instep portion are replaced on the same needles on which they were formed, connecting draw-off hooks to said tabs and to the lower end of said instep portion, and knitting a foot portion for said blank on said section while narrowing and operating, in a way to produce a diamond point toe.

11. The method of making a flat blank for a full fashioned stocking comprising knitting on a needle bar section a leg portion, an instep portion and heel portions, knitting ravel courses on said instep portion, with narrowings arranged to produce fashioning of the leg of the stocking, removing said instep portion from the needles of said section, knitting heel tabs on said heel portions, removing said tabs from said section and entirely from all connection with said bar section except through said heel portions, spreading said tabs by hand, placing the loops along the lower end of said instep portion and those along the inner edges of the tabs on the point of a topping bar, shifting said loops to the points of a transfer bar, transferring said loops back to the needles of said section so that the loops at the lower end of said instep portion are replaced on the same needles on which they were formed, connecting draw-off hooks to said tabs and to the lower end of said portion and knitting a foot portion for said blank on said section while narrowing and operating to produce a diamond point toe.

12. The method of making a flat blank for a full fashioned stocking comprising knitting on a needle bar section of a knitting machine, a leg portion, an instep portion and heel portions for said blank with narrowings arranged to produce fashioning of the stocking, knitting ravel courses on said instep portion, removing said instep portion from the needles of said section entirely from connection with said bar section except through said heel portions, knitting tabs on said heel portions, removing said tabs from the needles to entirely disconnect the blank from the machine, spreading said tabs, placing the loops along the lower edge of said instep portion and those along the edges of the tabs back on the needles in such a way that the loops of said instep portion are replaced each on the same needle on which it was formed, and knitting the foot portion of the blank.

GOTTLOB BITZER.